(12) United States Patent
Sasano et al.

(10) Patent No.: US 12,722,705 B2
(45) Date of Patent: Sep. 1, 2026

(54) VEHICLE FRONT STRUCTURE

(71) Applicant: Honda Motor Co., Ltd., Tokyo (JP)

(72) Inventors: Yamato Sasano, Tokyo (JP); Takehiro Kondo, Tokyo (JP); Akira Haga, Tokyo (JP); Takashi Nitta, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 346 days.

(21) Appl. No.: 18/399,685

(22) Filed: Dec. 29, 2023

(65) Prior Publication Data

US 2024/0270316 A1 Aug. 15, 2024

(30) Foreign Application Priority Data

Feb. 9, 2023 (CN) ........................ 202310085308.X

(51) Int. Cl.

| | |
|---|---|
| ***B62D 21/15*** | (2006.01) |
| ***B62D 25/02*** | (2006.01) |
| ***B62D 25/04*** | (2006.01) |
| ***B62D 25/14*** | (2006.01) |
| ***B62D 25/20*** | (2006.01) |
| ***B62D 27/02*** | (2006.01) |

(52) U.S. Cl.

CPC ......... *B62D 21/152* (2013.01); *B62D 25/025* (2013.01); *B62D 25/14* (2013.01); *B62D 27/023* (2013.01); *B62D 25/04* (2013.01); *B62D 25/2018* (2013.01); *B62D 25/2036* (2013.01)

(58) Field of Classification Search

CPC ...... B62D 25/02; B62D 25/04; B62D 25/025; B62D 25/14; B62D 25/145; B62D 25/20; B62D 25/2018; B62D 25/2036; B62D 21/15; B62D 21/152; B62D 27/023

USPC ... 296/203.03, 193.05, 187, 12, 29, 30, 209, 296/193.06

See application file for complete search history.

(56) References Cited

U.S. PATENT DOCUMENTS

| | | | | |
|---|---|---|---|---|
| 9,988,087 B2 * | 6/2018 | Yamamoto | B62D 25/025 | |
| 2010/0109370 A1 * | 5/2010 | Yamada | B62D 25/2018 | 296/70 |
| 2011/0133518 A1 * | 6/2011 | Wanke | B62D 25/2018 | 296/203.02 |
| 2012/0212009 A1 * | 8/2012 | Ishizono | B62D 25/2036 | 296/193.07 |
| 2015/0008703 A1 * | 1/2015 | Furusaki | B62D 25/025 | 296/187.08 |

(Continued)

FOREIGN PATENT DOCUMENTS

| | | |
|---|---|---|
| JP | 4033027 | 1/2008 |

*Primary Examiner* — Gregory A Blankenship
(74) *Attorney, Agent, or Firm* — JCIPRNET

(57) ABSTRACT

A vehicle front structure includes: a floor panel, disposed on a lower end side of a vehicle; a side sill, disposed on each side of the floor panel in a vehicle width direction, and extending along a vehicle front-rear direction; a pillar, disposed above the side sill, and extending in a vehicle upper-lower direction; a dash panel, disposed at a front of the side sill and the pillar to be erected upward toward a front from the floor panel, and partitioning a vehicle compartment and a front compartment; and a triangular gusset, bonded to an upper surface of the side sill and a vehicle inner surface of the pillar. The triangular gusset has an inclined surface obliquely extending upward from an inner end of the side sill toward the vehicle inner surface of the pillar. The inclined surface of the triangular gusset is bonded to the dash panel.

9 Claims, 7 Drawing Sheets

(56) References Cited

U.S. PATENT DOCUMENTS

| | | | | |
|---|---|---|---|---|
| 2015/0145284 | A1* | 5/2015 | Nishida | B62D 25/145 296/187.1 |
| 2017/0073012 | A1* | 3/2017 | Hyuga | B62D 21/152 |
| 2017/0080978 | A1* | 3/2017 | Yoshida | B62D 25/2018 |
| 2017/0203792 | A1* | 7/2017 | Sunohara | B62D 25/025 |
| 2019/0077464 | A1* | 3/2019 | Izutsu | B62D 25/14 |
| 2019/0084514 | A1* | 3/2019 | Izutsu | B62D 25/2036 |
| 2020/0086929 | A1* | 3/2020 | Watanabe | B60K 1/04 |
| 2020/0223493 | A1* | 7/2020 | Gill | B62D 25/2045 |
| 2021/0061368 | A1* | 3/2021 | Satoh | B62D 25/088 |
| 2021/0179184 | A1* | 6/2021 | Ohnaka | B62D 25/04 |
| 2021/0284245 | A1* | 9/2021 | Nakamura | B62D 25/025 |
| 2023/0286593 | A1* | 9/2023 | Kawano | B62D 25/2036 |
| 2023/0303181 | A1* | 9/2023 | Lee | B62D 25/2018 |
| 2024/0270316 | A1* | 8/2024 | Sasano | B62D 25/2018 |
| 2024/0270321 | A1* | 8/2024 | Sasano | B62D 25/2018 |

* cited by examiner

VEHICLE FRONT STRUCTURE

CROSS-REFERENCE TO RELATED APPLICATION

This application claims the priority benefit of China application no. 202310085308.X, filed on Feb. 9, 2023. The entirety of the above-mentioned patent application is hereby incorporated by reference herein and made a part of this specification.

BACKGROUND

Technical Field

The disclosure relates to a vehicle front structure.

Description of Related Art

In recent years, more and more efforts have been made to provide access to sustainable transportation systems that take into account vulnerable transportation participants such as the elderly, people with disabilities, and children. For this purpose, research and development efforts have been made to further improve traffic safety or convenience through development related to vehicle body rigidity. In the development related to vehicle body rigidity, the structural rigidity of a vehicle front structure has become an issue.

For example, in a conventional vehicle front structure formed by components such as a dash panel, a floor panel, a side sill, the lateral part of the dash panel is bonded to the front end of the side sill provided on a lateral side of the floor panel, and when a front collision occurs in a vehicle to which the vehicle front structure is applied, the load transmitted from a component (e.g., a side frame) on the front side of the dash panel to the dash panel can be transmitted toward the side sill, so that the side sill takes the load generated in the front collision. In this way, the dash panel can be prevented from being significantly deformed due to a rear load taken by the lateral part. However, the load taken by the dash panel at the time of the front collision cannot be transmitted in the vehicle width direction (e.g., transmitted from the inner side to the outer side in the vehicle width direction). Thus, there is a necessity to facilitate the structural rigidity of the entire vehicle front structure.

According to the disclosure, vehicle body rigidity is facilitated by effectively transmitting a collision load toward the outer side in the vehicle width direction. The disclosure thus also makes contribution to the development of sustainable transportation systems.

The disclosure provides a vehicle front structure capable of effectively transmitting a collision load toward an outer side in a vehicle width direction, thereby facilitating vehicle body rigidity.

SUMMARY

A vehicle front structure according to an aspect of the disclosure includes: a floor panel, disposed on a lower end side of a vehicle; a side sill, disposed on each of two sides of the floor panel in a vehicle width direction, and extending along a vehicle front-rear direction; a pillar, disposed above the side sill, and extending in a vehicle upper-lower direction; a dash panel, disposed at a front of the side sill and the pillar so that the dash panel is erected upward toward a front from the floor panel, and partitioning a vehicle compartment and a front compartment; and a triangular gusset, bonded to an upper surface of the side sill and a vehicle inner surface of the pillar. The triangular gusset has an inclined surface obliquely extending upward from an inner end of the side sill toward the vehicle inner surface of the pillar. The inclined surface of the triangular gusset is bonded to the dash panel.

To make the above features and advantages of the present invention more comprehensible, several embodiments accompanied with drawings are described in detail as follows.

DESCRIPTION OF THE EMBODIMENTS

Figure 1:
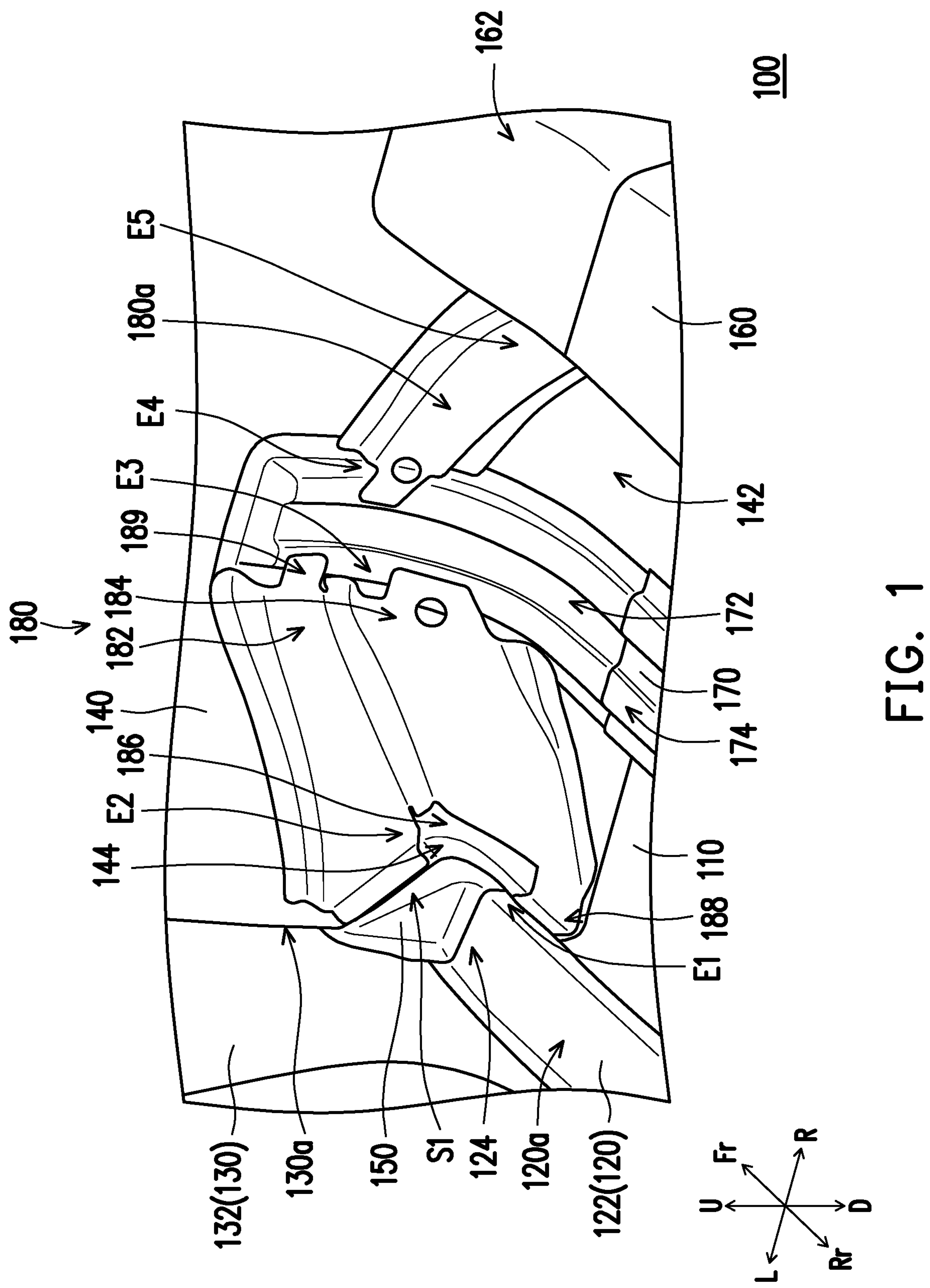
FIG. 1 is a schematic perspective view illustrating a vehicle front structure according to an embodiment of the disclosure.

A vehicle front structure according to an aspect of the disclosure includes: a floor panel, disposed on a lower end side of a vehicle; a side sill, disposed on each of two sides of the floor panel in a vehicle width direction, and extending along a vehicle front-rear direction; a pillar, disposed above the side sill, and extending in a vehicle upper-lower direction; a dash panel, disposed at a front of the side sill and the pillar so that the dash panel is erected upward toward a front from the floor panel, and partitioning a vehicle compartment and a front compartment; and a triangular gusset, bonded to an upper surface of the side sill and a vehicle inner surface of the pillar. The triangular gusset has an inclined surface obliquely extending upward from an inner end of the side sill toward the vehicle inner surface of the pillar. The inclined surface of the triangular gusset is bonded to the dash panel.

According to an embodiment of the disclosure, a lower end of the dash panel in the vehicle width direction is provided with a bevel part, and the bevel part is inclined upward from the inner end of the side sill toward the vehicle inner surface of the pillar, the bevel part of the dash panel, the upper surface of the side sill, and the vehicle inner surface of the pillar form a triangular opening when viewed in a front view, and the triangular gusset is fit into the opening part.

According to an embodiment of the disclosure, a flange part is provided on a periphery of the triangular gusset, and an upper end of the flange part is sandwiched by the dash panel and the pillar, and a lower end of the flange part is sandwiched by the dash panel and the side pillar, thereby forming a three-layer bonded structure.

According to an embodiment of the disclosure, The vehicle front structure further includes: a floor passage, disposed at a center of the floor panel in the vehicle width direction and extending along the vehicle front-rear direction; a front frame, disposed between the side sill and the floor passage, and extending in the vehicle front-rear direction by being erected upward along a vehicle inner side of the dash panel; and an outer cross member, extending from the front frame toward an outer side in the vehicle width direction and toward the side sill. An upper part of an outer end of the outer cross member is bonded to the dash panel along the bevel part, and a lower part of the outer end of the outer cross member is bonded to the side sill.

According to an embodiment of the disclosure, a notch part is provided at the outer end of the outer cross member, the notch part is cut along a bonding portion of the triangular gusset and the side sill on the outer side in the vehicle width direction, the outer cross member has a flange part on a rear side with respect to the notch part, and the outer cross member is bonded to the side sill by using the flange part.

According to an embodiment of the disclosure, the front frame is provided with a bead part extending in the vehicle front-rear direction, and the outer cross member is provided with a protrusion part bonded to the bead part of the front frame.

According to an embodiment of the disclosure, the triangular gusset has a longitudinal surface bonded to the vehicle inner surface of the pillar and a side surface bonded to the upper surface of the side sill, and a length of the longitudinal surface of the triangular gusset is greater than a length of the side surface.

According to an embodiment of the disclosure, a rear surface of the triangular gusset is inclined downward toward a rear.

According to an embodiment of the disclosure, the vehicle front structure further includes: a side frame, disposed in front of the dash panel. A front frame and the side frame are arranged along the vehicle front-rear direction to sandwich the dash panel. The front frame and an upper flange of the side frame are at least partially overlapped.

Based on the above, in the vehicle front structure according to the disclosure, the triangular gusset is bonded to the upper surface of the side sill and the vehicle inner surface of the pillar. The triangular gusset has the vehicle inner surface from the inner end of the side sill toward the pillar and the inclined surface extending obliquely upward. Also, the inclined surface of the triangular gusset is bonded to the dash panel. In this way, when a front collision occurs in the vehicle to which the vehicle front structure is applied, a load transmitted from a component (e.g., a side frame) on the front side of the dash panel to the dash panel can be taken by the triangular gusset having a higher rigidity and transmitted to the side sill behind the dash panel and the pillar on the outer end side of the dash panel through the inclined surface of the triangular gusset. In other words, the load generated in the front collision can be dispersed in the vehicle front-rear direction and the vehicle width direction. In this way, the structural rigidity is reinforced at a portion where the load may easily accumulate, such as a corner between the outer part and the lower part of the dash panel, thereby effectively suppressing the lateral part of the dash panel from being deformed. Accordingly, the vehicle front structure according to the disclosure is capable of effectively transmitting the collision load toward the outer side in the vehicle width direction, thereby facilitating vehicle body rigidity.

Figure 2:
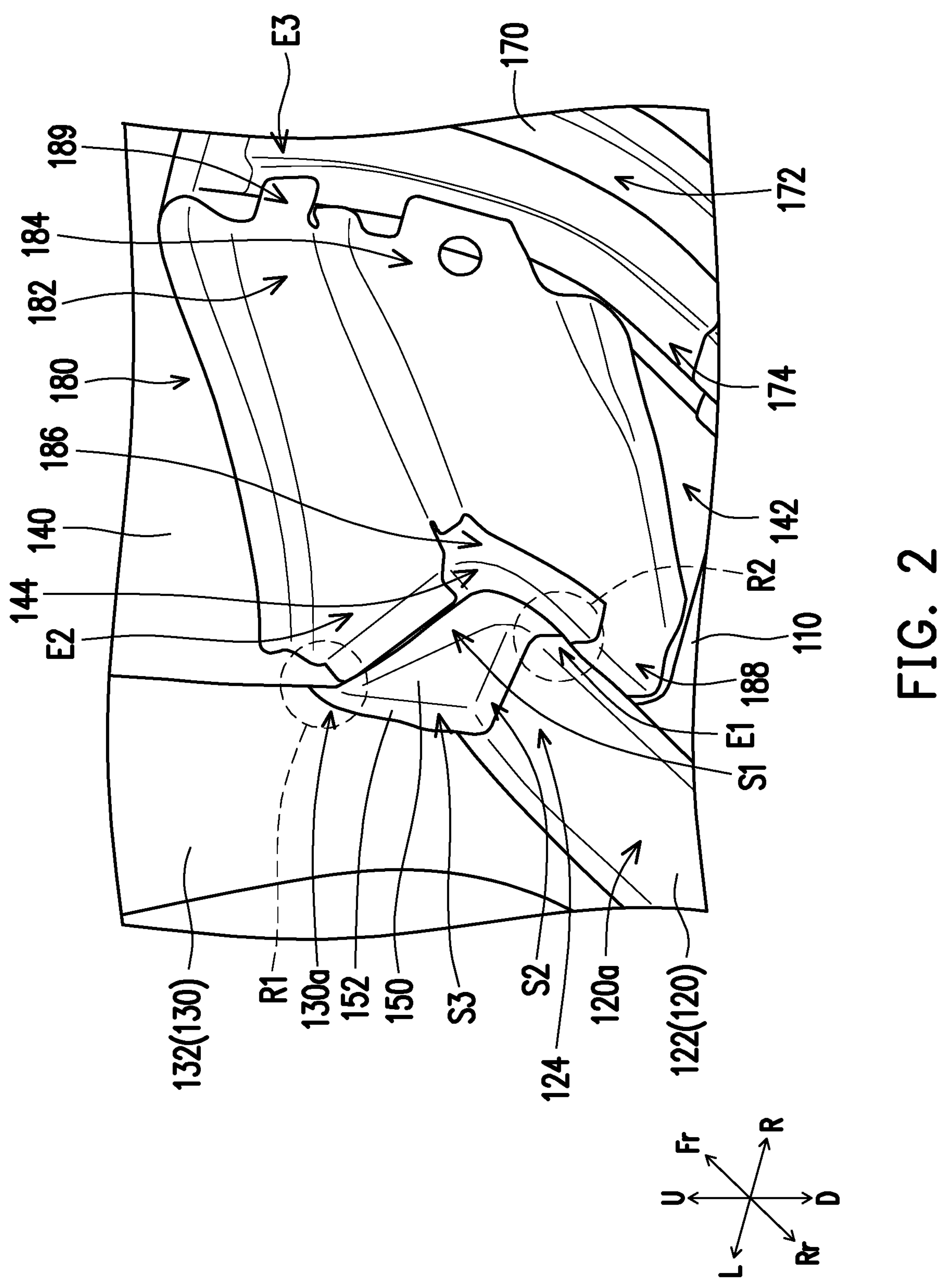
FIG. 2 is a partially enlarged schematic view illustrating the vehicle front structure shown in FIG. 1 at a triangular gusset.
Figure 3:
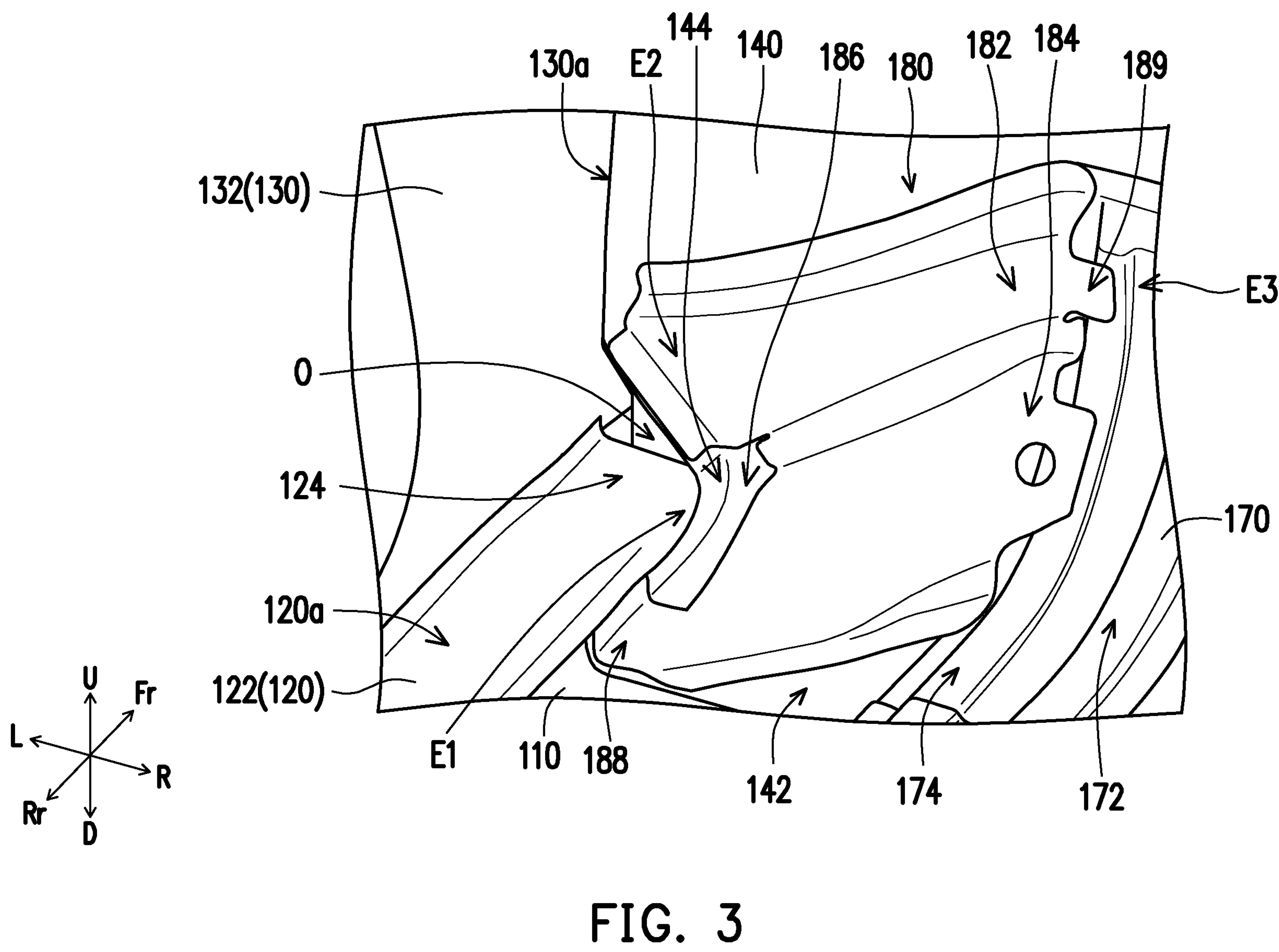
FIG. 3 is a partially enlarged schematic view illustrating the vehicle front structure shown in FIG. 2 after the triangular gusset is removed.
Figure 4:
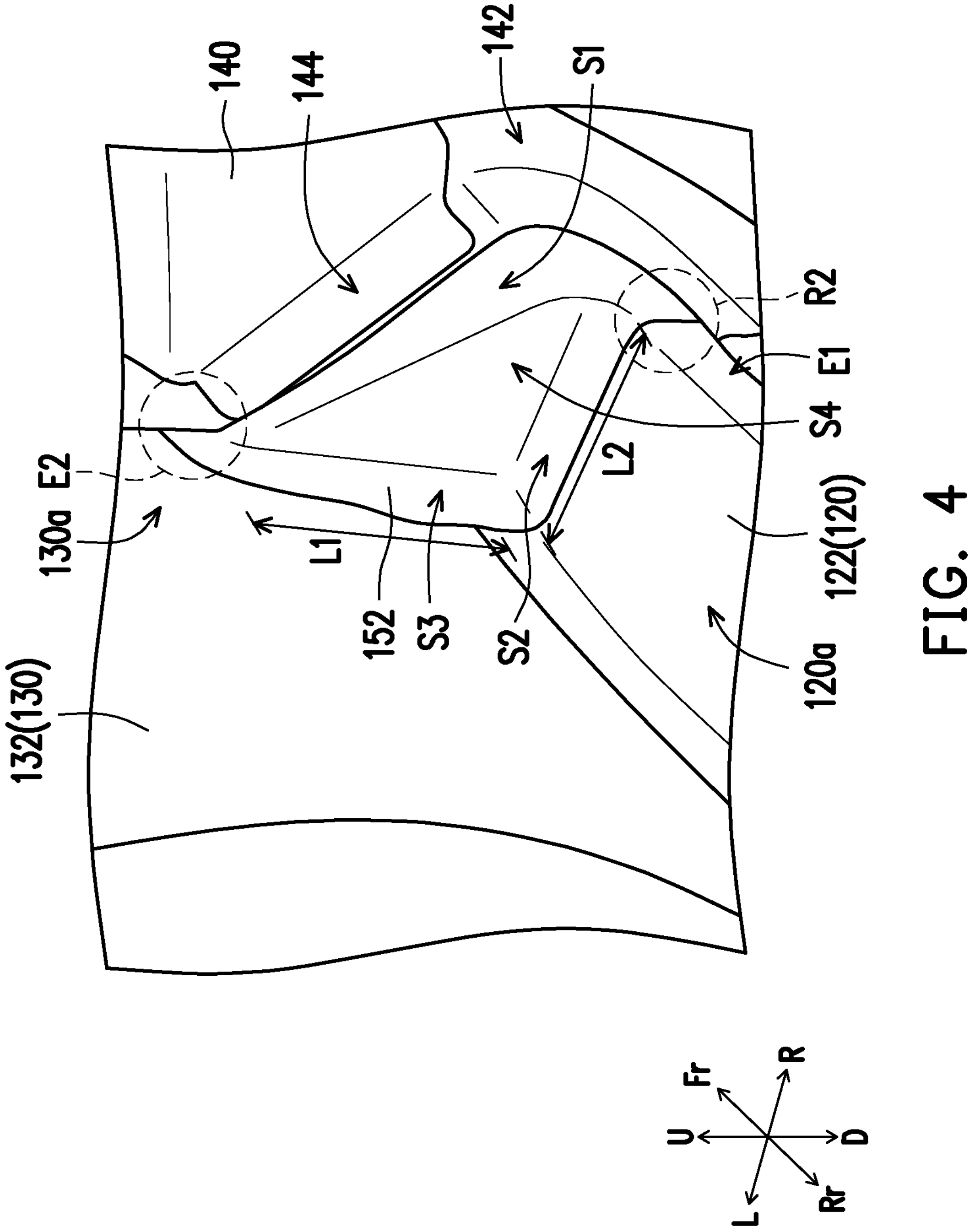
FIG. 4 is a partially enlarged schematic view illustrating the vehicle front structure shown in FIG. 2 after an outer cross member is removed.
Figure 5:
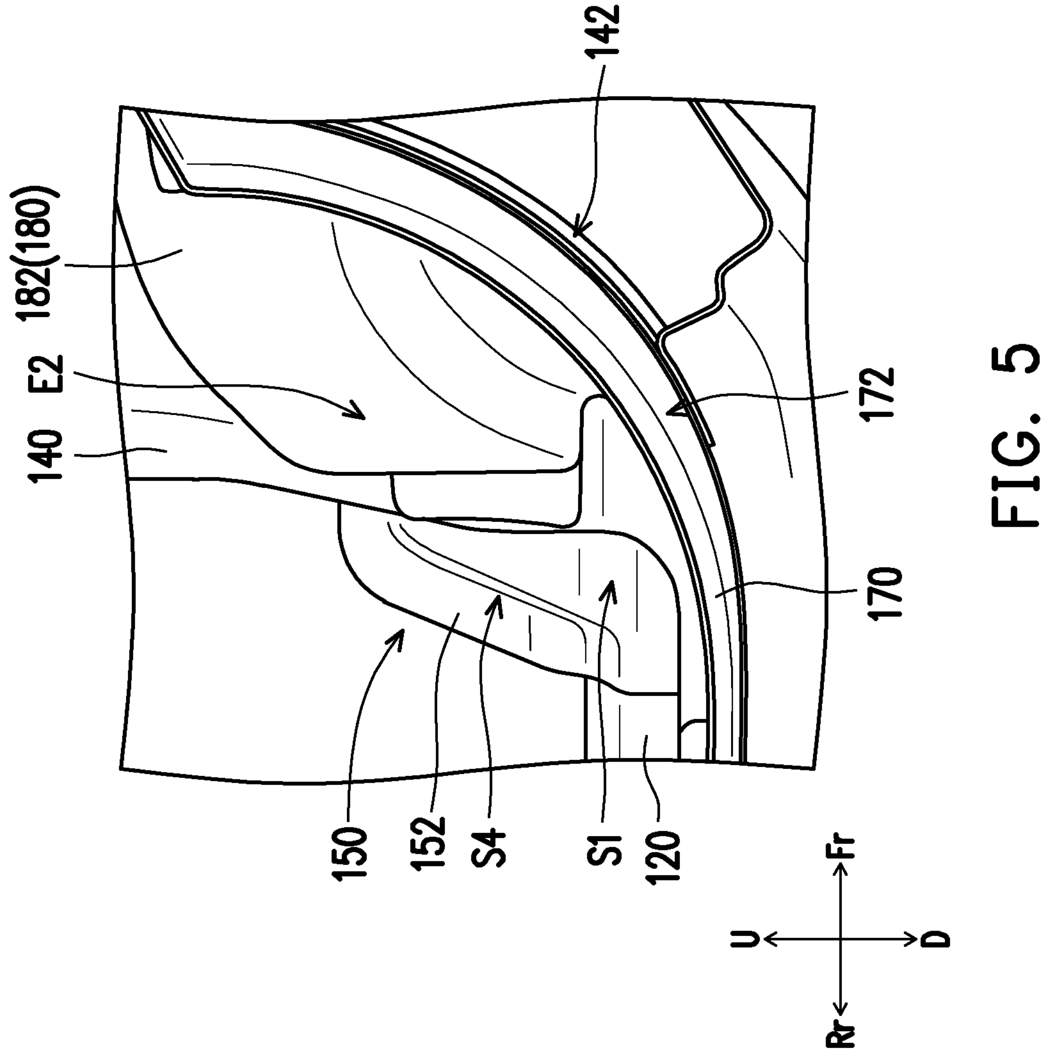
FIG. 5 is a partial schematic side view illustrating the vehicle front structure shown in FIG. 2 at the triangular gusset.
Figure 6:
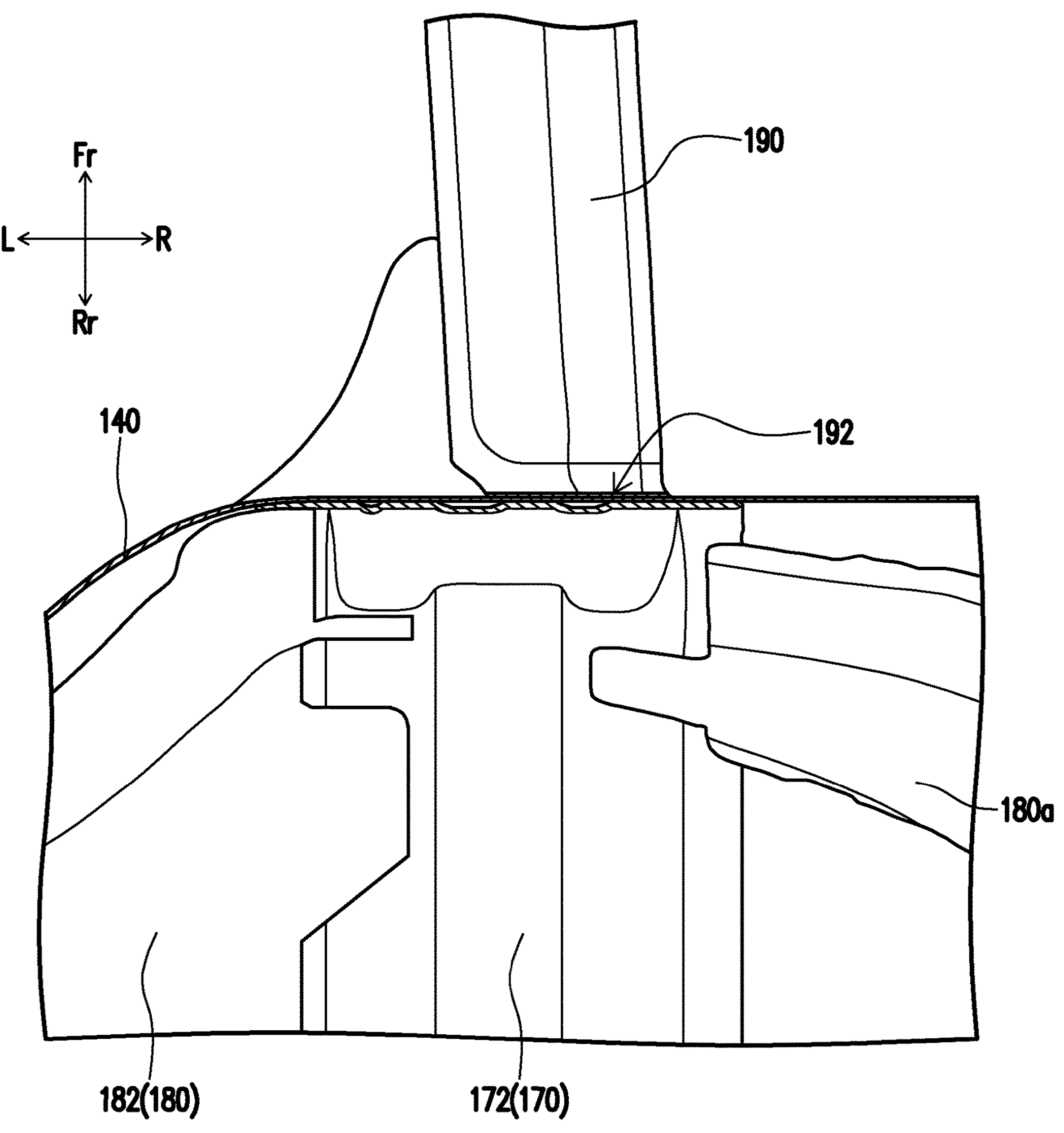
FIG. 6 is a schematic top view illustrating the vehicle front structure shown in FIG. 1 at a side frame.
Figure 7:
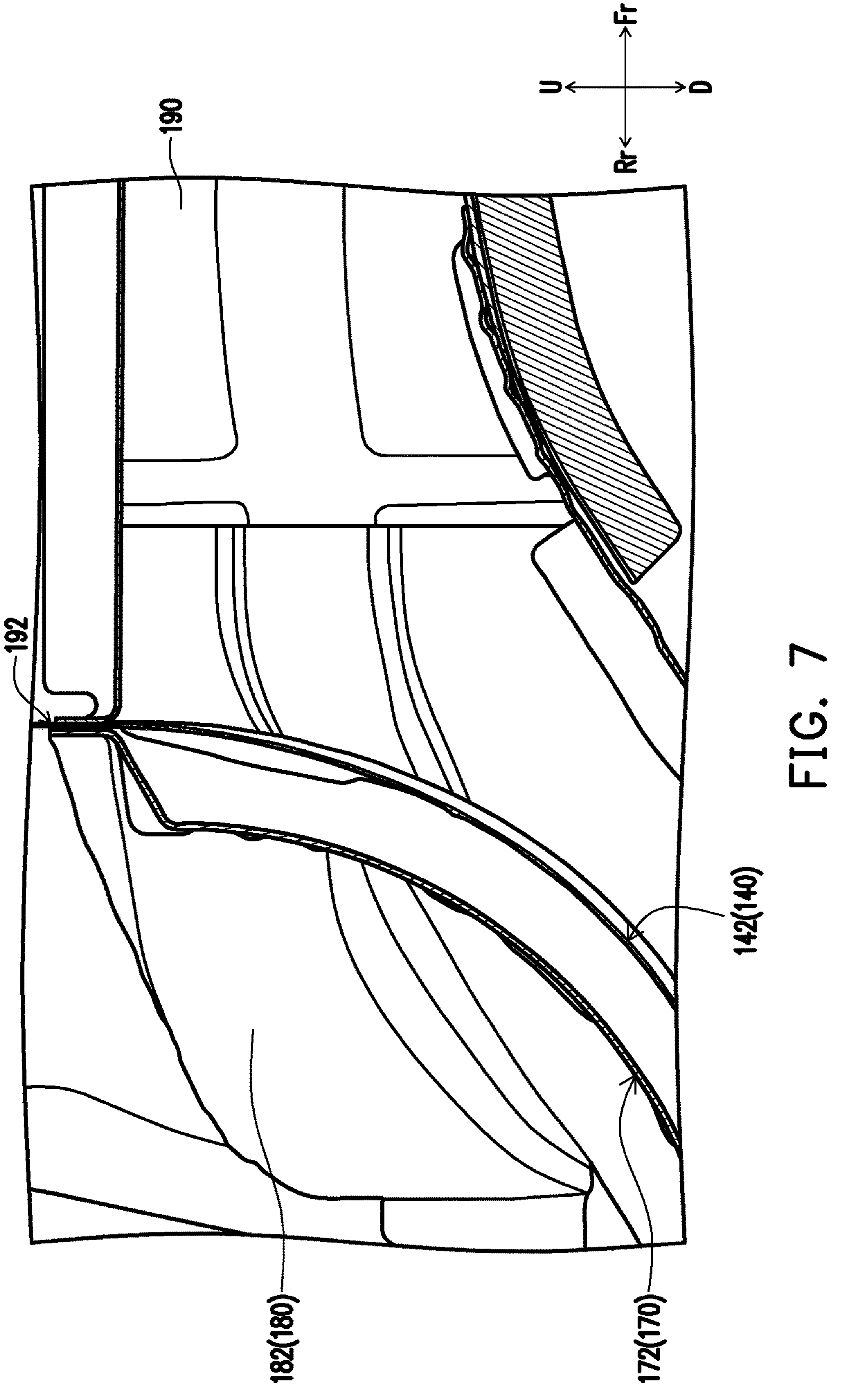
FIG. 7 is a partial schematic side view illustrating the vehicle front structure shown in FIG. 6.

FIG. 1 is a schematic perspective view illustrating a vehicle front structure according to an embodiment of the disclosure. FIG. 2 is a partially enlarged schematic view illustrating the vehicle front structure shown in FIG. 1 at a triangular gusset. FIG. 3 is a partially enlarged schematic view illustrating the vehicle front structure shown in FIG. 2 after the triangular gusset is removed. FIG. 4 is a partially enlarged schematic view illustrating the vehicle front structure shown in FIG. 2 after an outer cross member is removed. FIG. 5 is a partial schematic side view illustrating the vehicle front structure shown in FIG. 2 at the triangular gusset. FIG. 6 is a schematic top view illustrating the vehicle front structure shown in FIG. 1 at a side frame. FIG. 7 is a partial schematic side view illustrating the vehicle front structure shown in FIG. 6. In the following, a detailed configuration of a vehicle front structure 100 according to the embodiment is described with reference to FIGS. 1 to 7. In the drawings, the vehicle-front-rear direction refers to, for example, a vehicle front direction Fr and a vehicle rear direction Rr in the drawings, the vehicle width direction refers to, for example, a vehicle left direction L and a vehicle right direction R in the drawings, and the vehicle upper-lower direction refers to, for example, a vehicle upper direction U and a vehicle lower direction D in the drawings. However, the above merely serves as an example, and the disclosure shall not be construed as being limited thereto.

Referring to FIG. 1, in the embodiment, the vehicle front structure 100 refers to a structure on the front end side (i.e., the side corresponding to the vehicle front direction Fr) of the vehicle (not shown) in the vehicle front-rear direction. The vehicle front structure 100 includes a floor panel 110, a side sill 120, a pillar 130, a dash panel 140, and a triangular gusset 150. The floor panel 110 is disposed on the lower end side of the vehicle (i.e., the side corresponding to the vehicle lower direction D). The side sill 120 is disposed on each of the two sides of the floor panel 110 in the vehicle width direction (i.e., the vehicle left direction L and the vehicle right direction R), and extends along the vehicle front-rear direction (i.e., the vehicle front direction Fr and the vehicle rear direction Rr). In FIG. 1, only one side sill 120 is shown, but a pair of side sills 120 may be disposed. The pillar 130 is disposed above the side sill 120, and extends along the vehicle upper-lower direction (i.e., the vehicle upper direction U and the vehicle lower direction D). In the case where a pair of side sills 120 are disposed, a pair of pillars 130 may also be disposed. In FIG. 1, only one pillar 130 is shown. The dash panel 140 is disposed at the front of the side sill 120 and the pillar 130 so as to be erected upward from the floor panel 110 toward the front. In addition, the dash panel 140 partitions the vehicle compartment and a front compartment (not shown). The triangular gusset 150 is bonded to an upper surface **120*a* of the side sill 120 and a vehicle inner surface 130*a* of the pillar 130. Specifically, the triangular gusset 150 has an inclined surface S1 obliquely extending upward from an inner end of the side sill 120 toward the vehicle inner surface 130*a* of the pillar 130. In addition, the inclined surface S1 of the triangular gusset 150 is bonded to the dash panel 140. However, the disclosure does not intend to limit the exact position of the vehicle front structure 100 (i.e., not intend to limit the application of the vehicle front structure 100 in the vehicle), and does not intend to limit the exact structure of the vehicle front structure 100** applied in the vehicle, either. Relevant arrangement may be modified as needed.

Specifically, in the embodiment, as shown in FIG. 1, the floor panel 110 is, for example, a plate member having a concave-convex structure not shown herein, so as to form the bottom of the vehicle front structure 100 on the lower end side of the vehicle. The dash panel 140 is, for example, a plate member having a concave-convex structure not shown herein, and is erected upward from the floor panel 110 toward the front. That is, the lower end of the dash panel 140 forms a curved part 142, and the rear end of the curved part 142 is connected with the floor panel 110, so that the dash panel 140 erected upward toward the front from the curved part 142. The dash panel 140 partitions the vehicle compartment and the front compartment on the vehicle inner side of the vehicle. For example, the front compartment for mounting vehicle components is on the front side of the dash panel 140, and the vehicle compartment for passengers is on the rear side. The side sill 120 is a frame structure extending in the vehicle front-rear direction, such as being a hollow frame formed by a side sill inner member 122 bonded to the floor panel 110 and a side sill outer member (not shown) disposed on the outer side of the side sill inner member 122 in the vehicle width direction, and has a closed cross-sectional surface. Thus, the side sill 120 has a rigidity higher than the rigidity of the plate structures, such as the floor panel 110 and the dash panel 140. In addition, a front end 124 of the side sill 120 further extends from the floor panel 110 to the outer part of the dash panel 140 to be located on the outer side of the curved part 142. Similarly, the pillar 130 is a frame structure extending in the vehicle upper-lower direction, such as being a hollow frame formed by a pillar inner member 132 bonded to the side sill 120 and a pillar outer member (not shown) provided on the outer side of the pillar inner member 132 in the vehicle width direction, and has a closed cross-sectional surface. Therefore, the pillar 130 has a higher rigidity. In addition, the upper end side of a vehicle inner surface 130*a* of the pillar 130 (i.e., the vehicle inner surface of the pillar inner member 132) is further bonded to the outer part of the dash panel 140. That is, the floor panel 110, the side sill 120, the pillar 130, and the dash panel 140 are bonded to each other. In particular, the frame structures, such as the side sill 120 and the pillar 130, are bonded to the outer sides of the floor panel 110 and the dash panel 140 in the vehicle width direction, and respectively extend upward in the vehicle front-rear direction and the vehicle upper-lower direction. In this way, the structural rigidity of the vehicle front structure 100 can be facilitated. However, the structure, size, quantity and position of each component may be modified as needed. The disclosure does not intend to impose a limitation in this regard.

Moreover, in the embodiment, as shown in FIGS. 1 and 2, the triangular gusset 150 is, for example, a triangular plate member when viewed in a front view. Thus, the triangular gusset 150 has the inclined surface S1 obliquely extending upward from an inner end E1 of the side sill 120 toward the vehicle inner surface 130*a* of the pillar 130, a side surface S2 bonded to the upper surface 120*a* of the side sill 120, and a longitudinal surface S3 bonded to the vehicle inner surface 130*a* of the pillar 130. In addition, the inclined surface S1 of the triangular gusset 150 is bonded to the dash panel 140. In other words, the three surfaces on the periphery of the triangular gusset 150 are respectively bonded to the dash panel 140, the upper surface 120*a* of the side sill 120, and the vehicle inner surface 130*a* of the pillar 130. In this way, when a front collision occurs in a vehicle to which the vehicle front structure 100 is applied, a load transmitted from a component (e.g., a side frame) on the front side of the dash panel 140 to the dash panel 140 can be taken by the triangular gusset 150 having a higher rigidity and transmitted to the side sill 120 behind the dash panel 140 and the pillar 130 on the outer end side of the dash panel 140 through the inclined surface S1 of the triangular gusset 150. In other words, the load generated in the front collision can be dispersed in the vehicle front-rear direction and the vehicle width direction. In this way, the structural rigidity is reinforced at a portion where the load may easily accumulate, such as a corner between the outer part and the lower part of the dash panel 140, thereby effectively suppressing the lateral part of the dash panel 140 from being deformed. Accordingly, the vehicle front structure 100 is capable of effectively transmitting a collision load toward the outer side in the vehicle width direction, thereby facilitating vehicle body rigidity.

More specifically, in the embodiment, as shown in FIGS. 2 to 4, a bevel part 144 is provided at the lower end of the dash panel 140 in the vehicle width direction, and the bevel part 144 is inclined upward from the inner end E1 of the side sill 120 toward the vehicle inner surface 130*a* of the pillar 130. In this way, the bevel part 144 of the dash panel 140, the upper surface 120*a* of the side sill 120, and the vehicle inner surface 130*a* of the pillar 130 form a triangular opening part O (as shown in FIG. 3) when viewed in a front view, and the triangular gusset 150 is fit in the opening part O (as shown in FIG. 2). As an example, a flange part 152 is provided on the periphery of the triangular gusset 150. The flange part 152 is, for example, a sheet-like structure protruding from the side surface S2 and the longitudinal surface S3 of the triangular gusset 150, and is bonded to the upper surface 120*a* of the side sill 120 and the vehicle inner surface 130*a* of the pillar 130. The upper end of the flange part 152 is sandwiched by the dash panel 140 and the pillar 130 (a region R1 as shown in FIGS. 2 and 4), and the lower end of the flange part 152 is sandwiched by the dash panel 140 and the side sill 120 (a region R2 as shown in FIGS. 2 and 4), thereby forming a three-layer bonded structure. Similarly, the bevel part 144 of the dash panel 140 is formed to exhibit a structure having a flange, and is bonded to the inclined surface S1 of the triangular gusset 150 (as shown in FIG. 4). Accordingly, the bonding range between the bevel part 144 of the dash panel 133 and the inclined surface S1 of the triangular gusset 150 can be increased. However, the disclosure does not intend to limit how exactly the triangular gusset 150 is bonded to components such as the dash panel 140, the side sill 120, and the pillar 130. Relevant arrangement may be modified as needed.

Moreover, as shown in FIG. 4, in the embodiment, a length L1 of the longitudinal surface S3 of the triangular gusset 150 bonded to the vehicle inner surface 130*a* of the pillar 130 is greater than a length L2 of the side surface S2 bonded to the upper surface 120*a* of the side sill 120. In other words, the bonding area (corresponding to the longitudinal surface S3) between the triangular gusset 150 and the vehicle inner surface 130*a* of the pillar 130 is greater than the bonding area (corresponding to the side surface S2) between the triangular gusset 150 and the upper surface 120*a* of the side sill 120. In this way, the area for taking a load on the inclined surface S1 of the triangular gusset 150 can be increased. Moreover, the longer longitudinal surface S3 allows transmission of the load to the pillar 130 in a greater range when a front collision occurs, and is able to arrange relatively gentle slopes for the inclined surface S1 and the bevel part 144 bonded to the inclined surface S1. As a result, the moldability of the dash panel 140 can be facilitated. In addition, as shown in FIGS. 4 and 5, a rear surface S4 of the triangular gusset 150 is inclined downward toward the rear. That is, a hypotenuse of the inclined surface S1 of the triangular gusset 150 toward the rear side (i.e., the ridgeline between the inclined surface S1 and the rear surface S4) is inclined downward toward the rear. As a result, the lower end of the inclined surface S1 is more protrusive toward the rear with respect to the upper end. In this way, compared with the case where the triangular gusset is arranged so that the rear surface stands still (no inclination) and the majority of the load is transmitted downward and outward, the rearward transmission of the load by using the triangular gusset 150 can be facilitated by arranging the triangular gusset 150 to have the rear surface S4 inclined downward toward the rear. In this way, the majority of the load is transmitted toward the side sill 120, and, as a result, the structural rigidity of the periphery of the triangular gusset 150 can be facilitated, thereby effectively suppressing the lateral part of the dash panel 140 from being deformed. However, the disclosure does not intend to limit the specific configuration of the triangular gusset 150. Relevant configuration may be modified as needed.

In addition, in the embodiment, as shown in FIG. 1, the vehicle front structure 100 further includes a floor passage 160, a front frame 170, and an outer cross member 180. The floor passage 160 is arranged at the center of the floor panel 110 in the vehicle width direction, and extends along the vehicle front-rear direction. The front frame 170 is disposed between the side sill 120 and the floor passage 160, and extends in the vehicle front-rear direction by being erected upward along the vehicle inner side of the dash panel 140. In FIG. 1, one front frame 170 is shown. However, a pair of front frames may be disposed. The outer cross member 180 extends from the front frame 170 toward the outer side of the vehicle width direction and toward the side sill 120. An upper part 182 of an outer end E2 of the outer cross member 180 is bonded to the dash panel 140 along the bevel part 144, and a lower part 184 of the outer end E2 of the outer cross member 180 is bonded to the side sill 120. In correspondence thereto, an inner end E3 of the outer cross member 180 is bonded to the front frame 170. In this way, when a front collision occurs in the vehicle to which the vehicle front structure 100 is applied, the load transmitted from a component (e.g., a side frame) on the front side of the dash panel 140 to the front frame 170 can be transmitted toward the side sill 120 and the pillar 130 via the outer cross member 180 and the triangular gusset 150 having a higher rigidity. In addition, the upper part 182 of the outer end E2 of the outer cross member 180 is bonded to the dash panel 140 along the bevel part 144 and able to effectively transmit the load transmitted to the outer cross member 180 to the triangular gusset 150, thereby more easily supported by the side sill 120 and the pillar 130.

More specifically, in the embodiment, like the side sill 120, the floor passage 160 and the front frame 170 are, for example, frame structures extending in the vehicle front-rear direction. In addition, from the center to the sides of the floor panel 110 in the vehicle width direction, the floor passage 160, the front frame 170, and the side sill 120 are arranged in order. In addition, a front end 162 of the floor passage 160 further extends from the floor panel 110 to the curved part 142 of the dash panel 140. The front frame 170 is disposed along the curved part 142 of the dash panel 140 and erected upward, so as to further extend from the floor panel 110 to the dash panel 140, for example. That is, the front end 172 of the front frame 170 is disposed along the curved part 142 of the dash panel 140 and erected upward to be curved. Correspondingly, the outer cross member 180 is, for example, a frame structure extending from the front frame 170 toward the side sill 120 substantially along the vehicle width direction. In the case where a pair of side sills 120 and a pair of front frames 170 are disposed, a pair of outer cross members 180 may also be disposed. However, in FIG. 1, only one outer cross member 180 is shown. Nevertheless, the structure, size, quantity, and position of each component and whether such component is disposed may be modified as needed. The disclosure does not intend to impose a limitation in this regard.

Moreover, in the embodiment, as shown in FIGS. 1 and 2, a notch part 186 is provided at the outer end E2 of the outer cross member 180. The notch part 186 is cut along the bonding portion of the triangular gusset 150 and the side sill 120 (i.e., the inner surfaces of the triangular gusset 150 and the side sill 120) on the outer side in the vehicle width direction. In other words, the upper part 182 and the lower part 184 form a lid-like structure extending substantially in the vehicle width direction, and cover the dash panel 140 with an open side surface of the lid-like structure facing the dash panel 140. Accordingly, a closed cross-sectional surface is formed. The notch part 186 is formed on the lower side of the upper part 182 and the outer side of the lower part 184, such as being formed by retracting the outer edge of the lower part 184 toward the inner side. Thus, the notch part 186 exposes a portion of the dash panel 140 covered by the outer cross member 180. In addition, the exposed portion corresponds to the bonding portion of the triangular gusset 150 and the side sill 120. Thus, it is arranged that the load transmitted from a component (e.g., a side frame) on the front side of the dash panel 140 to the triangular gusset 150 is mainly transmitted from the bevel part 144 of the dash panel 140 (including the load taken by the dash panel 140 and the load transmitted from the front frame 170 toward outer end E2 and to the bevel part 144 via the upper part 182 of the outer cross member 180). That is, the load applied to the triangular gusset 150 is input from a single direction. In this way, the deformation of the peripheral structure of the triangular gusset 150 can be suppressed. Moreover, the outer cross member 180 has a flange part 188 on the rear side with respect to the notch part 186. That is, the flange part 188 is formed, in the lower part 184 of the outer cross member 180, at a portion on the rear side with respect to the notch part 186. In addition, the outer cross member 180 is bonded to the side sill 120 by using the flange part 188. In this way, the load transmitted from the front frame 170 via the lower part 184 of the outer cross member 180 can be directly transmitted to the side sill 120 via the flange part 188. Thus, the load taken by the triangular gusset 150 can be reduced, and the load can be effectively transmitted in a greater range. However, the disclosure does not intend to limit the specific configuration of the outer cross member 180. Relevant configuration may be modified as needed.

Similarly, as shown in FIG. 1, in the embodiment, an inner cross member **180*a* extending from the front frame 170 toward the inner side in the vehicle width direction and toward the floor passage 160 may also be disposed between the front frame 170 and the floor passage 160 based on needs. An outer end E4 of the inner cross member 180*a* is bonded to the front frame 170, and an inner end E5 of the inner cross member 180*a* is bonded to the floor passage 160. More specifically, the inner cross member 180*a* is, for example, a frame structure extending from the front frame 170 toward the floor passage 160 substantially in the vehicle width direction. In the case where a pair of front frames 170 are disposed, a pair of inner cross members 180*a* may also be disposed. However, in FIG. 1, only one inner cross member 180*a* is shown. The inner cross member 180*a* may be formed as a lid-like structure extending substantially in the vehicle width direction, and covers the dash panel 140 with an open side surface of the lid-like structure facing the dash panel 140. Accordingly, a closed cross-sectional surface is formed. In this way, when a front collision occurs in the vehicle to which the vehicle front structure 100 is applied, the load transmitted from a component (e.g., a side frame) on the front side of the dash panel 140 to the front frame 170 can be transmitted to the floor passage 160 having a higher rigidity via the inner cross member 180***a* having a higher rigidity, thereby effectively transmitting the load in a greater range. Nevertheless, the exact structure, size, quantity, and position of the inner cross member 180*a* and whether the inner cross member 180*a* is disposed are not particularly limited. The disclosure does not intend to impose a limitation in this regard.

Moreover, in the embodiment, as shown in FIGS. 1 and 2, a bead part 174 extending in the vehicle front-rear direction is provided at the front frame 170. In addition, the outer cross member 180 has a protrusion part 189 bonded to the bead part 174 of the front frame 170. The protrusion part 189 of the outer cross member 180 is, for example, formed at the inner end E3 of the outer cross member 180 and corresponds to the upper part 182 and the lower part 184 (i.e., two protrusion parts 189 are provided). In addition, the protrusion part 189 is bonded to the bead part 174 of the front frame 170. In this way, the bead part 174 can increase the ridgeline on the surface of the front frame 170, thereby increasing the rigidity in the vehicle front-rear direction to cope with a front collision load. Moreover, the protrusion part 189 bonded to the bead part 174 can effectively transmit the load taken by the front frame 170 toward the bevel part 144 of the dash panel 140 and to the triangular gusset 150 via the outer cross member 180. Similarly, in the case where the inner cross member 180*a* is provided, the inner cross member 180*a* may also be provided with a protrusion part (not shown) bonded to the ridge part 174 of the front frame 170. Also, it may be arranged that the protrusion part 189 of the outer cross member 180 and the protrusion of the inner cross member 180*a* are staggered from each other, thereby preventing the rigidity from being concentrated at a position of the front frame 170 to reduce the rigidity difference in the entire front frame 170, while increasing the overall structural rigidity. However, the disclosure does not intend to limit the quantities, sizes, and exact positions of the bead part 174 and the protrusion part 189 and whether the bead part 174 and the protrusion part 189 are disposed. Relevant configuration may be modified as needed.

In addition, in the embodiment, as shown in FIGS. 6 and 7, the vehicle front structure 100 further includes a side frame 190 disposed at the front of the dash panel 140 (blocked by the dash panel 140 and therefore not shown in FIG. 1). The side frame 190 is, for example, a frame structure extending in the vehicle front-rear direction. In addition, the front frame 170 and the side frame 190 are arranged along the vehicle front-rear direction to sandwich the dash panel 140. In addition, the front frame 170 is at least partially overlapped with an upper flange 192 of the side frame 190. In other words, the side frame 190 and the front frame 170 may be respectively disposed on the front side and the rear side of the dash panel 140. In FIGS. 6 and 7, only one side frame 190 is shown. However, a pair of side frames 190 may be disposed. In addition, the front frame 170 and the side frame 190 are bonded to each other by sandwiching the dash panel 140, and are arranged along the vehicle front-rear direction in correspondence with each other (e.g., the upper flange 192 of the side frame 190 serves as a bonding part and is at least partially overlapped with the front frame 170). In this way, when a front collision occurs in the vehicle to which the vehicle front structure 100 is applied, the front collision load is transmitted to the front frame 170 by using the side frame 190 disposed at the front of the dash panel 140, so as to be transmitted toward the rear side via the front frame 170. In addition, the load is transmitted to the side sill 120 via the outer cross member 180 bonded to the front frame 170, thereby dispersing the impact of the collision load to the vehicle front structure 100. Specifically, the front frame 170 is at least partially overlapped with the upper flange 192 of the side frame 190. Therefore, the side frame 190 and the front frame 170 are in correspondence with each other (as shown in FIG. 6) at substantially the same horizontal height. In this way, the rear side of the side frame 190 can be supported by the front frame 170, so that the tilting of the dash panel 140 due to the intrusion of the side frame 190 toward the vehicle inner side (i.e., rear side) can be suppressed at the time when the front collision occurs. Furthermore, the load can be more effectively transmitted to the triangular gusset 150 via the bevel part 144 of the dash panel 140. However, the disclosure does not intend to limit the exact configuration of the side frame 190 as well as the relative positions of the side frame 190 and the front frame 170, etc. Relevant configuration may be modified as needed.

In view of the foregoing, in the vehicle front structure according to the disclosure, the triangular gusset is bonded to the upper surface of the side sill and the vehicle inner surface of the pillar. The triangular gusset has the vehicle inner surface from the inner end of the side sill toward the pillar and the inclined surface extending obliquely upward. Also, the inclined surface of the triangular gusset is bonded to the dash panel. The flange part may be disposed on the periphery of the triangular gusset. The upper end of the flange part is sandwiched by the dash panel and the pillar, and the lower end of the flange part is sandwiched by the dash panel and the side sill. In this way, a three-layer bonded structure is formed. In this way, when a front collision occurs in the vehicle to which the vehicle front structure is applied, a load transmitted from a component (e.g., a side frame) on the front side of the dash panel to the dash panel can be taken by the triangular gusset having a higher rigidity and transmitted to the side sill behind the dash panel and the pillar on the outer end side of the dash panel through the inclined surface of the triangular gusset. In other words, the load generated in the front collision can be dispersed in the vehicle front-rear direction and the vehicle width direction. In this way, the structural rigidity is reinforced at a portion where the load may easily accumulate, such as a corner between the outer part and the lower part of the dash panel, thereby effectively suppressing the lateral part of the dash panel from being deformed. Accordingly, the vehicle front structure according to the disclosure is capable of effectively transmitting the collision load toward the outer side in the vehicle width direction, thereby facilitating vehicle body rigidity.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle front structure, comprising:

a floor panel, disposed on a lower end side of a vehicle;

a side sill, disposed on each of two sides of the floor panel in a vehicle width direction, and extending along a vehicle front-rear direction;

a pillar, disposed above the side sill, and extending in a vehicle upper-lower direction;

a dash panel, disposed at a front of the side sill and the pillar so that the dash panel is erected upward toward a front from the floor panel, and partitioning a vehicle compartment and a front compartment; and a triangular gusset, bonded to an upper surface of the side sill and a vehicle inner surface of the pillar, wherein the triangular gusset has an inclined surface obliquely extending upward from an inner end of the side sill toward the vehicle inner surface of the pillar, and the inclined surface of the triangular gusset is bonded to the dash panel, wherein a lower end of the dash panel in the vehicle width direction is provided with a bevel part, and the bevel part is inclined upward from the inner end of the side sill toward the vehicle inner surface of the pillar, the bevel part of the dash panel, the upper surface of the side sill, and the vehicle inner surface of the pillar form a triangular opening part when viewed in a front view, and the triangular gusset is fit into the triangular opening part.

2. The vehicle front structure as claimed in claim 1, wherein a flange part is provided on a periphery of the triangular gusset, and an upper end of the flange part is sandwiched by the dash panel and the pillar, and a lower end of the flange part is sandwiched by the dash panel and the side sill, thereby forming a three-layer bonded structure.

3. The vehicle front structure as claimed in claim 1, further comprising:

a floor passage, disposed at a center of the floor panel in the vehicle width direction and extending along the vehicle front-rear direction;

a front frame, disposed between the side sill and the floor passage, and extending in the vehicle front-rear direction by being erected upward along a vehicle inner side of the dash panel; and an outer cross member, extending from the front frame toward an outer side in the vehicle width direction and toward the side sill, wherein an upper part of an outer end of the outer cross member is bonded to the dash panel along the bevel part, and a lower part of the outer end of the outer cross member is bonded to the side sill.

4. The vehicle front structure as claimed in claim 3, wherein a notch part is provided at the outer end of the outer cross member, the notch part is cut along a bonding portion of the triangular gusset and the side sill on the outer side in the vehicle width direction, the outer cross member has a flange part on a rear side with respect to the notch part, and the outer cross member is bonded to the side sill by using the flange part.

5. The vehicle front structure as claimed in claim 3, wherein the front frame is provided with a bead part extending in the vehicle front-rear direction, and the outer cross member is provided with a protrusion part bonded to the bead part of the front frame.

6. The vehicle front structure as claimed in claim 1, wherein the triangular gusset has a longitudinal surface bonded to the vehicle inner surface of the pillar and a side surface bonded to the upper surface of the side sill, and a length of the longitudinal surface of the triangular gusset is greater than a length of the side surface.

7. The vehicle front structure as claimed in claim 1, wherein a rear surface of the triangular gusset is inclined downward toward a rear.

8. The vehicle front structure as claimed in claim 1, further comprising:

a side frame, disposed in front of the dash panel, wherein a front frame and the side frame are arranged along the vehicle front-rear direction to sandwich the dash panel; and the front frame and an upper flange of the side frame are at least partially overlapped.

9. A vehicle front structure, comprising:

a floor panel, disposed on a lower end side of a vehicle;

a side sill, disposed on each of two sides of the floor panel in a vehicle width direction, and extending along a vehicle front-rear direction;

a pillar, disposed above the side sill, and extending in a vehicle upper-lower direction;

a dash panel, disposed at a front of the side sill and the pillar so that the dash panel is erected upward toward a front from the floor panel, and partitioning a vehicle compartment and a front compartment; and a triangular gusset, bonded to an upper surface of the side sill and a vehicle inner surface of the pillar, wherein the triangular gusset has an inclined surface obliquely extending upward from an inner end of the side sill toward the vehicle inner surface of the pillar, and the inclined surface of the triangular gusset is bonded to the dash panel, wherein a lower end of the dash panel in the vehicle width direction is provided with a bevel part that is inclined upward from the inner end of the side sill toward the vehicle inner surface of the pillar, and the bevel part is configured to exhibit a structure having a flange, and is bonded to the inclined surface of the triangular gusset.

* * * * *